Sept. 23, 1958 H. E. LIEBELT ET AL 2,853,320
SCREW THIMBLE-COMPRESSED TYPE FITTING
FOR FLEXIBLE PLASTIC TUBING
Filed Sept. 27, 1954

INVENTORS
HOWARD E. LIEBELT
HERMAN S. STARBUCK
BY J. Warren Kinney, Jr.
ATTORNEY

United States Patent Office 2,853,320
Patented Sept. 23, 1958

2,853,320

SCREW THIMBLE-COMPRESSED TYPE FITTING FOR FLEXIBLE PLASTIC TUBING

Howard E. Liebelt, Norwood, and Herman S. Starbuck, Cincinnati, Ohio, assignors to S & C Manufacturing Co., Cincinnati, Ohio, a corporation of Ohio Application September 27, 1954, Serial No. 458,532

1 Claim. (Cl. 285—247)

This invention relates to fittings for flexible plastic tubing, and more particularly to fittings fabricated from rigid plastic material.

An object of the invention is to provide a rigid plastic fitting for flexible plastic tubing, said fitting including a body element provided with externally conical seats which are constructed and arranged to be easily inserted by hand into the end of a length of plastic tubing for gradually and uniformly expanding the end of the tubing as it is positioned on the conical seat.

Another object of the invention is to provide a rigid plastic fitting for flexible plastic tubing which includes a body element having an externally conical seat upon which the free end of a flexible plastic tubing may be drawn, and a nut including an internally conical seat dimensioned to engage and exert an annular compressive force upon the tubing disposed on the externally conical seat.

A further object of the invention is to provide a rigid plastic fitting having the hereinabove described characteristics wherein the degree of taper of the internally conical seat of the nut is less than the degree of taper of the externally conical seat of the body element.

Still a further object of the invention is to provide a nut with an internal conical portion which is provided with a plurality of annular rings into which the outer surface of the tubing will project incident to the application of a compressive force thereto.

Another object of the invention is to provide a rigid plastic fitting which may be securely though releasably secured to flexible plastic tubing without requiring the use of tools of any kind and without requiring that the end of the tube be initially processed or otherwise treated.

These and other objects are attained by the means disclosed herein and as described in the accompanying drawings, in which.

Considerable difficulty has been encountered in those instances wherein it has become necessary or desirable to interconnect or couple lengths of flexible plastic tubing, and particularly in those instances wherein the tubing is fabricated from polyethylene or other flexible plastic material having "cold flow" characteristics.

Flexible plastic tubing is being extensively used to conduct gases and fluid media through corrosive atmospheres. Heretofore conventional metallic compression fittings were used, however such fittings, unless fabricated from stainless steel, were expensive to install and maintain since they had to be carefully and adequately wrapped in corrosion-resistant tape. In those instances where stainless steel fittings were used, the initial expense was prohibitive.

Our fittings have effectively overcome the objectionable features of the metallic fittings in that they are not only inexpensive, but corrosion-resistant as well. Our fittings have also overcome the objectionable features of the prior art plastic fittings which require that the end of plastic tubing be initially processed or otherwise treated. In this connection we are fully aware of the prior art patents to Dorman, No. 2,366,444, in which the end of the plastic tubing is processed to include an outturned annular cuff which is receivable in an annular chamber provided between interconnectable compression elements; with the Thayer Patent No. 2,439,351, in which the ends of the plastic tubing are initially expanded or flared outwardly to be received between the steep, complementary, divergent faces of the interconnectable elements; and with the Borg Patent No. 2,269,433, for malleable metallic tubing which is initially processed to have a flared end receivable between complementary faces of a metallic compression coupling.

One of the primary objects of our invention is to provide a rigid plastic fitting which may be quickly associated with a length of flexible plastic tubing by merely inserting the external conical seat of the body portion into the end of a length of tubing and of then drawing a nut also fabricated from rigid plastic onto the end of the tubing seated on the body portion.

With particular reference now to the drawings, the numeral 10 denotes generally an axially bored body element one or both ends of which terminate in an externally conical seat 12 the axial length of which exceeds, by at least 25%, the outside diameter of the flexible plastic tubing 14 which is to be connected to our fitting.

The taper of conical seat 12 is less than 10°, being preferably from 6° to 8°. The inner end of seat 12 terminates in an axial abutment 16 at right angles with the longitudinal axis of the fitting.

Figure 1:
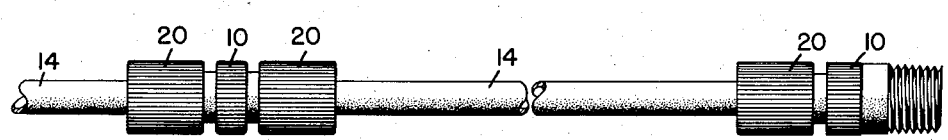
Fig. 1 is a side view of lengths of tubing interconnected by fittings embodying the teachings of the present invention.
Figure 2:
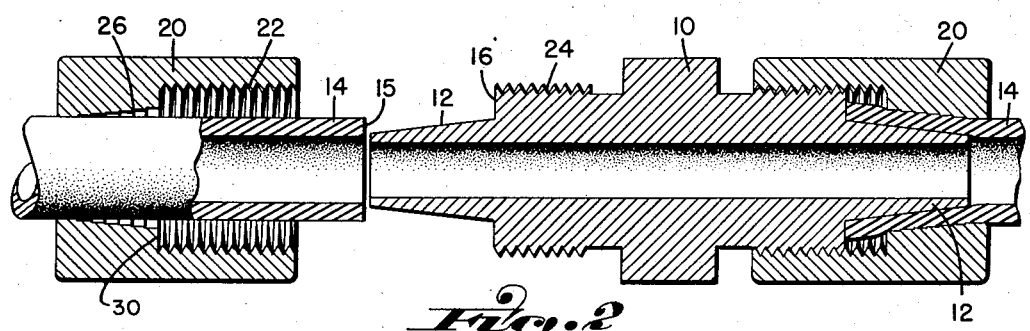
Fig. 2 is an enlarged sectional view illustrating a fitting to one end of which a length of tubing has been coupled, and illustrating, at the other end thereof, the relationship of the fitting and tubing prior to being coupled.
Figure 3:
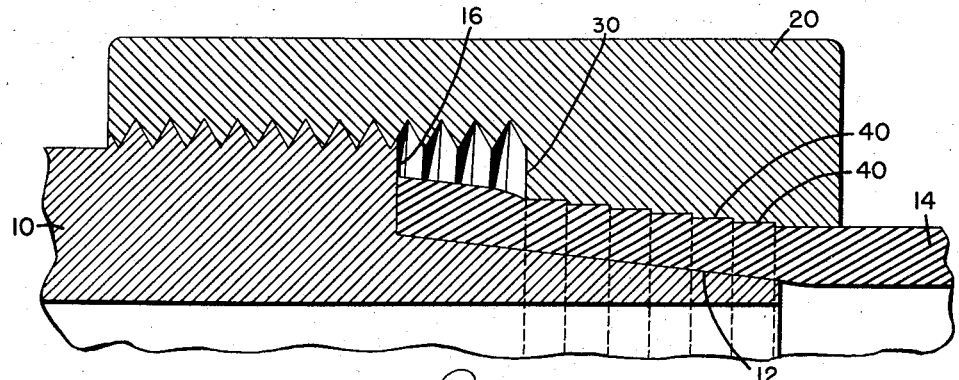
Fig. 3 is an enlarged fragmentary view illustrating the interrelationship of the fitting and tubing.
Figure 4:
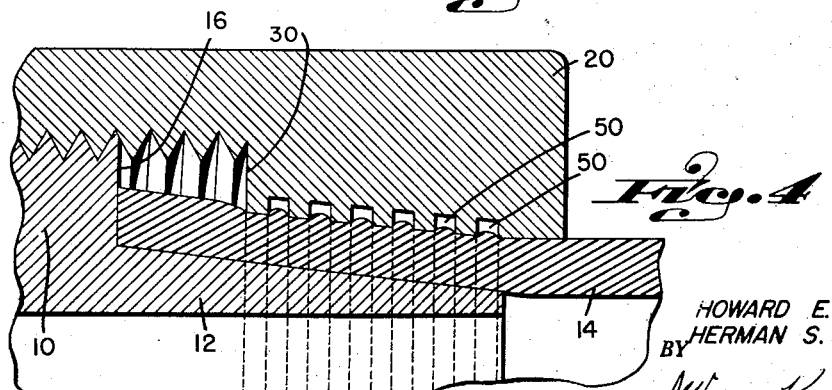
Fig. 4 is a view similar to Fig. 3 illustrating a modified form of nut construction.

A nut 20 is provided with a forward, internally threaded portion 22 adapted to threadably engage the externally threaded portion 24 of the body element. The inner end of threaded portion 22 terminates in an axial abutment 30 at right angles with the longitudinal axis of the fitting. The nut likewise includes an internally conical portion or seat 26 which extends from axial abutment 30 which is complementary to the taper 12 of the body element, said internally conical portion 26 being provided with a plurality of annular rings 40 and 50, note Figs. 3 and 4, respectively. The taper of the internally conical portion of the nut is approximately 1° less than the taper of the externally conical seat 12 of the body element; and the overall length of tapered portion 26 of the nut is less than the length of tapered portion 12 of the body element.

Body element 10 and nut 20 are fabricated from a rigid plastic such as, by way of example, non-plasticized rigid polyvinyl chloride.

Our fitting may be conveniently and quickly secured to the end of a length of flexible plastic tubing by merely inserting the externally conical seat 12 of body element 10 into the end of tubing 14 until the free outer end 15 of the tubing abuts against wall 16. Nut 20, having been previously slipped over the end of the tubing, is then advanced forwardly toward the body element for threaded engagement therewith. As clearly illustrated in Figs. 3 and 4, as the nut is drawn onto the body element the outer surface of that portion of the tubing which is seated upon the externally conical seat 12 will be subjected to uniform annular compressive forces which will tightly seal the inner surface of the tubing onto conical portion 12, while at the same time the cold flow characteristics of the tubing will cause the outer face of the tubing to enter annular rings 40 and 50 for effecting a tight locking action therewith which will effectively preclude the accidental or unintentional dislodgement of the tubing from the fitting.

Since the taper of the internally conical portion 26 of the nut is less than the taper of the externally conical portion 12 of body element 10, the compressive forces applied to the end of the tubing incident to threading the nut onto the body element will automatically compensate for any thinning which might occur in the wall thickness of the expanded end of the tubing. As clearly illustrated in Figs. 3 and 4, the end of the tubing is tightly urged against axial abutment 16 with such force that the tubing between said end and the adjacent end of the internally conical seat of the nut is compressed whereby to assume its original thickness; it will be noted that the conical seat portion of nut 20 is adapted to engage the entire conical outer surface of the expanded end portion of tube 14 with the forward end of the nut disposed forwardly of and beyond the forward conically tapered end of the body element and tube.

From the foregoing, it will be noted that we have provided a simple, inexpensive, yet highly efficient fitting of rigid plastic for use with flexible plastic tubing. It should be understood that various changes and modifications may be made within the scope of the appended claim without departing from the spirit of the invention.

What is claimed is:

A fitting of rigid plastic for flexible plastic tubing, comprising an axially bored body element having an external uniformly tapered conical end portion and an axial abutment at the inner end of said conical end portion, said conical end portion being adapted to be inserted into an end of a length of flexible plastic tubing until the end of the tubing abuts against said axial abutment to expand the adjoining end portion of the tubing to conical form, said body element having an externally threaded portion extending from said axial abutment, said threaded portion being larger in diameter than the diameter of the conical portion, a nut having an internally threaded portion engageable with the externally threaded portion of the body element, and said nut having an axial abutment at the inner end of its threaded portion and an internal uniformly tapered conical seat terminating at the outer end of the nut, and being of less diameter than the diameter of its threaded portion, said seat of the nut being provided with a plurality of annular grooves disposed in end-to-end stepped relationship and each having an annular side wall disposed at right angles to the axis of the nut and facing toward the axial abutment of the nut, and an end wall parallel with the axis of the nut, said seat extending from its axial abutment of a length less than the length of the conical end portion of the body element and adapted to engage the entire length of the conical outer surface of the expanded end portion of the flexible tubing on the conical end portion of the body element from a point inwardly of the outer end of said expanded end portion and outwardly of the axial abutment of the body element to the innermost portion of said expanded end portion with the abutments in spaced relation for simultaneously urging the end of the tubing against the axial abutment of the body element while applying compressive forces to that portion of the tubing disposed between the conical end portion of the body element and the conical seat of the nut, the outer end part of the expanded end portion of the tubing on the conical portion of the body element in advance of the axial abutment of the nut being subjected to endwise pressure and compressed to project radially outwardly in front of the axial abutment of the nut, the uniform taper of the conical end portion of the body element being from 6° to 8°, and the uniform taper of the internal conical seat of the nut being approximately one degree less than the taper of the conical end portion of the body element, the conical surfaces converging toward the threaded portions of the nut and the body element.

References Cited in the file of this patent

UNITED STATES PATENTS

| 956,294 | Corcoran | Apr. 26, 1910 |
| 1,175,834 | Stephens | Mar. 14, 1916 |
| 1,211,387 | Beck | Jan. 9, 1917 |
| 1,233,401 | Reeve | July 17, 1917 |
| 1,275,996 | Audemars | Aug. 13, 1918 |
| 1,479,917 | Johnson | Jan. 8, 1924 |
| 2,439,351 | Thayer | Apr. 6, 1948 |
| 2,545,263 | Corydon | Mar. 13, 1951 |

FOREIGN PATENTS

| 112,280 | Great Britain | Mar. 21, 1918 |